(12) United States Patent
Enders (10) Patent No.: US 7,654,557 B2
(45) Date of Patent: Feb. 2, 2010

(54) BLOW MOLDED KNEE AIRBAG WITH INTEGRATED REACTION PLATE

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 386 days.

(21) Appl. No.: 11/519,534

(22) Filed: Sep. 12, 2006

(65) Prior Publication Data
US 2008/0061537 A1 Mar. 13, 2008

(51) Int. Cl.
B60R 21/205 (2006.01)
(52) U.S. Cl. .................. 280/728.2; 280/732; 280/730.1
(58) Field of Classification Search .................. 280/752, 280/753, 728.2, 730.1, 732
See application file for complete search history.

(56) References Cited

U.S. PATENT DOCUMENTS

| 5,811,506 | A  | * | 9/1998  | Slagel .......................... 528/64 |
| 6,032,978 | A  |   | 3/2000  | Spencer et al. |
| 6,170,871 | B1 | * | 1/2001  | Goestenkors et al. .... 280/743.1 |
| 6,213,497 | B1 |   | 4/2001  | Spencer et al. |
| 6,517,103 | B1 | * | 2/2003  | Schneider ................ 280/730.1 |
| 2005/0236427 | A1 | * | 10/2005 | Farha et al. ................. 222/105 |
| 2006/0108775 | A1 | * | 5/2006  | Schirholz et al. ......... 280/728.2 |

* cited by examiner

Primary Examiner—Paul N Dickson
Assistant Examiner—Drew Brown
(74) Attorney, Agent, or Firm—Sally J Brown; Madson IP, P.C.

(57) ABSTRACT

A knee airbag system for a vehicle is disclosed. The knee airbag system may include a reaction plate having a plurality of apertures. The knee airbag system may include an airbag. The airbag may have a plurality of locations that are disposed to correspond to the plurality of apertures if the airbag is positioned for attachment to the reaction plate. The knee airbag system may also include a plurality of protrusions. The plurality of protrusions may extend through the plurality of apertures for securing the reaction plate to the airbag.

5 Claims, 5 Drawing Sheets

BLOW MOLDED KNEE AIRBAG WITH INTEGRATED REACTION PLATE

BACKGROUND OF THE INVENTION

1. Field of the Invention

The present invention relates to attaching an airbag to the interior of a vehicle. More specifically, the present invention relates to a blow molded knee airbag with an integrated reaction plate for mounting to a vehicle.

2. Description of Related Art

Inflatable airbags enjoy widespread acceptance as passive passenger restraints for use in motor vehicles. This acceptance has come as airbags have built a reputation of preventing numerous deaths and injuries as the result of years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

As a result in part because of the benefits such as those described above, automakers are now required to install airbags in most new vehicles manufactured for sale in the United States. Many automobile manufacturers have turned this airbag technology requirement into a marketing tool. Enticed by the promise of added safety, vehicle purchasers frequently seek out vehicles with sophisticated airbag systems.

Airbags may be mounted in vehicular panels near the steering wheel, in the region or components of the glove box, in vehicle doors, along vehicle roof rails, walls, vehicle floors, or beneath a dashboard to provide deceleration in specific types of collision events.

As experience with the manufacture and use of airbags has progressed, the engineering challenges involved in their design, construction, and use have become better understood. Most airbag systems are designed to rapidly inflate and provide a cushion in front of or alongside an occupant based on a presumption that the occupant will be in a predetermined position. Problems have been observed when the occupant is "out of position" when a collision occurs and the airbag deploys. Similar problems may occur when the occupant is deflected away from the airbag before proper deceleration can occur.

Out-of-position injuries may be attributed in part to the fact that most airbag systems deploy in front of the torso of an occupant. More specifically, these conventional airbags deploy between the upper torso of an occupant and the windshield and instrument panel. During a front-end collision, there is a tendency for an occupant, particularly one who is not properly restrained by a seat belt, to slide forward along the seat. This results in poor kinematics and positioning when the occupant interacts with a frontal airbag, such as a driver or a passenger's side airbag.

During a front end collision, there is a tendency for an occupant, particularly one who is not properly restrained by a seat belt, to slide forward along the seat and "submarine" under the airbag (hereinafter referred to as the "primary airbag"). When the occupant submarines, the primary airbag is less effective in protecting the occupant. Such submarining causes the vehicle occupant's knees to contact the instrument panel or structure beneath the panel. Further injuries can occur when the occupant's legs move forward such that the knees are trapped in or beneath the instrument panel just before the foot well collapses. As the foot well collapses, the vehicle occupant's feet are pushed backward, which causes the knees to elevate and become further trapped. As the foot well continues to crush, the load on the trapped legs increase and can cause foot, ankle, and leg injuries.

In order to improve occupant protection, knee airbag systems have been developed. Knee airbag systems typically engage an occupant's knees or lower legs and prevent submarining under the primary airbag. Knee airbag systems are generally positioned in the lower portion of the instrument panel. Typical knee airbag systems include a knee airbag and an inflator. The inflator, once triggered, uses compressed gas, solid fuel, or their combination to produce rapidly expanding gas to inflate the airbag. The inflated knee airbag occupies a generally rectangular volume of the vehicle leg compartment. These systems hold the occupant in place on the seat, and improve the kinematics for the occupant.

Such knee airbag systems often include a knee airbag, a reaction plate, and a panel. The panel, referred to as a knee bolster panel is disposed forward of the knee airbag. The reaction plate is typically required by a knee airbag system to allow the air bag to expand or deploy in the correct direction. In some cases the reaction plate is a part of the instrument panel. In other cases, often due to vehicle assembly concerns, the reaction plate may be part of the knee airbag module. Having the reaction plate on the module may complicate how the reaction plate is attached to the airbag. Typically mechanical fasteners, such as rivets, or screws are used to attach the reaction plate to the airbag.

However, the use of mechanical fasteners may create additional labor, part, and design expenses. For example, holes must be machined into the airbag such that the fasteners can effectively attach the two parts. Moreover, it is labor intensive and time consuming to use mechanical fasteners. The design expenses also increase because the installation order and process of the knee airbag system must be considered in designing these types of covers. When these additional expenses are incurred with respect to a large number of vehicles, the total expense can be substantial.

Accordingly, there is a need in the art for a novel knee airbag system that addresses one or more of the above-listed problems. Such a system is disclosed herein.

BRIEF SUMMARY OF THE INVENTION

A knee airbag system for a vehicle typically requires a reaction plate against which the expansive forces from an inflator can interplay to deploy the airbag in the proper direction. In order to reduce the number of parts required, and thereby the assembly costs, the reaction plate may be attached to the knee airbag and to the instrument panel. The following embodiments may be used to attach the reaction plate to the knee airbag.

In one embodiment, a knee airbag system for a vehicle includes a reaction plate, an airbag, and a plurality of protrusions. The reaction plate has a plurality of apertures. The airbag has a plurality of locations disposed to correspond to the plurality of apertures if the airbag is positioned for attachment to the reaction plate. The plurality of protrusions extends through the plurality of apertures for securing the reaction plate to the airbag.

In some embodiments of the knee airbag system, at least one of the plurality of protrusions has a base. In other embodiments, at least one of the plurality of protrusions is extended from the plurality of locations through the plurality of apertures using a manufacturing process. In further embodiments, at least one of the plurality of protrusions is modified to limit detachment of the airbag from the reaction plate. In still further embodiments, the reaction plate comprises a metal reaction plate.

In the embodiments of the knee airbag system where at least one of the plurality of protrusions has a base, the base is connected to at least one of the plurality of locations using a manufacturing process or modification process. In one embodiment, the manufacturing process is connected to at least one of the plurality of locations using the blow molding process. In another embodiment, at least one of the plurality of protrusions shares the base with at least one other plurality of protrusions.

In one of the embodiments, at least one of the plurality of protrusions is extended from the plurality of locations through the plurality of apertures using the blow molding process.

In some embodiments, at least one of the plurality of protrusions is modified to limit detachment of the airbag from the reaction plate using thermoplastic welding. In other embodiments, at least one of the plurality of protrusions is modified to limit detachment of the airbag from the reaction plate by a manufacturing process. In further embodiments, the manufacturing process is the blow molding process.

In another embodiment, a method for attaching a reaction plate to an airbag is used. The method includes providing the airbag comprising a plurality of locations. The method also includes providing the reaction plate comprising a plurality of apertures disposed to correspond to the plurality of locations if the reaction plate is positioned for attachment to the airbag. Inserting a plurality of protrusions through the plurality of apertures for securing the reaction plate to the airbag is also included in the method. The method includes positioning the reaction plate and the airbag such that the plurality of extrudable locations and the corresponding plurality of apertures are substantially aligned.

In other embodiments, at least one of the plurality of protrusions is inserted through at least one of the plurality of apertures by a manufacturing process that extends material from the airbag through at least one of the plurality of apertures. In some embodiments, the manufacturing process that inserts the plurality of protrusions through the plurality of apertures is the blow molding process. In further embodiments, the airbag that is provided is blown from a parison. In some embodiments, at least one of the plurality of protrusions is modified to capture the reaction plate such that the airbag and reaction plate are attached.

In further embodiments, at least one of the plurality of protrusions further comprises a base. In some embodiments, the base is connected to the airbag.

In a further embodiment, a knee airbag system for a vehicle includes a metal plate and an airbag. The metal reaction plate includes at least one web. The metal reaction plate may also include a plurality of apertures. At least two of the apertures are separated by at least one web. The airbag comprises a plurality of protrusions extending through the plurality of apertures for securing the reaction plate to the airbag. At least one of the plurality of protrusions is thermoplastically welded together.

BRIEF DESCRIPTION OF THE SEVERAL VIEWS OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION OF THE INVENTION

Various embodiments of the invention are now described with reference to the Figures. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used extensively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, and thermal interaction.

The phrase "directly attached to" refers to a form of attachment by which the attached items are either in direct contact, or are only separated by a single fastener, adhesive, or other attachment mechanism.

Figure 1:
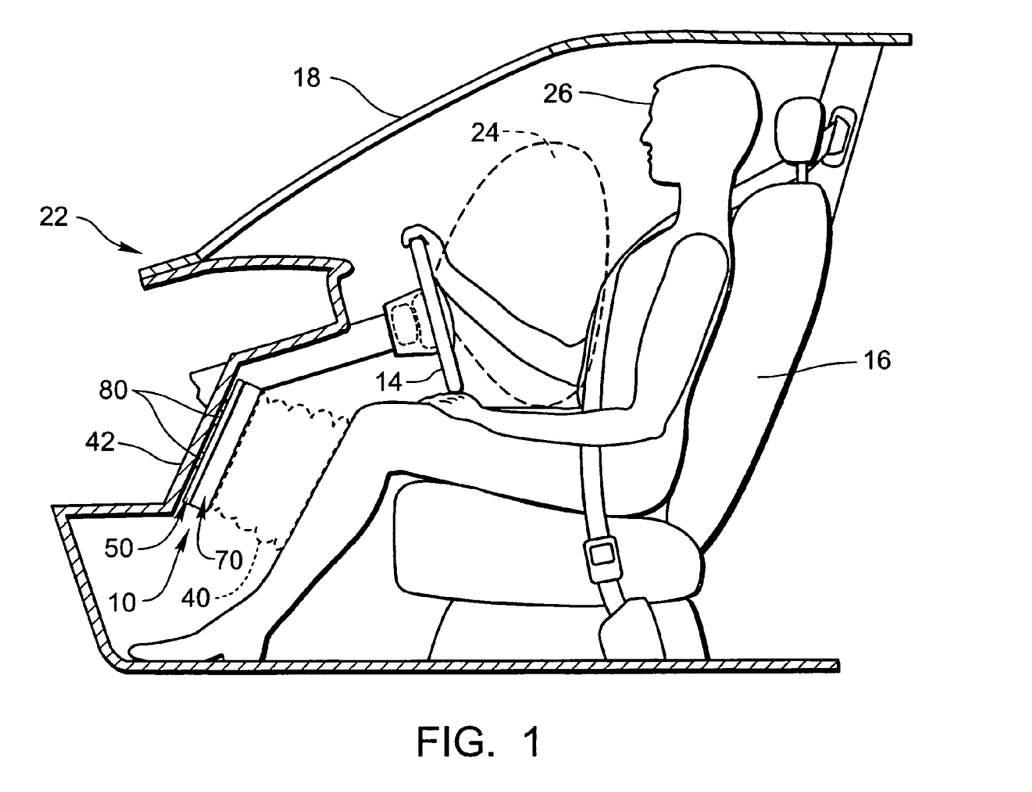
FIG. 1, a cutaway sectional view of an embodiment of a knee airbag system installed in a vehicle showing inflated airbags in phantom lines.

Referring to FIG. 1, a cutaway sectional view of an embodiment of a knee airbag system 10 is shown installed in a vehicle 22. Here, a vehicle occupant 26 is shown seated in a front seat 16 on the driver's side. A primary airbag 24 is mounted in a steering wheel 14 and inflated (shown in phantom) between the occupant 26 and a windshield 18 of the vehicle 22. In this cross-sectional view, the present embodiment of a knee airbag system 10 comprises a reaction plate 50 and an airbag 40. The reaction plate 50 may be attached to the instrument panel 42 using instrument panel clips 80. The reaction plate 50 may also be attached to the airbag 40. When inflated (as shown in phantom) the airbag 40 is placed in front of the knees and/or lower legs of a vehicle occupant 26 to inhibit movement out of position.

Figure 2:
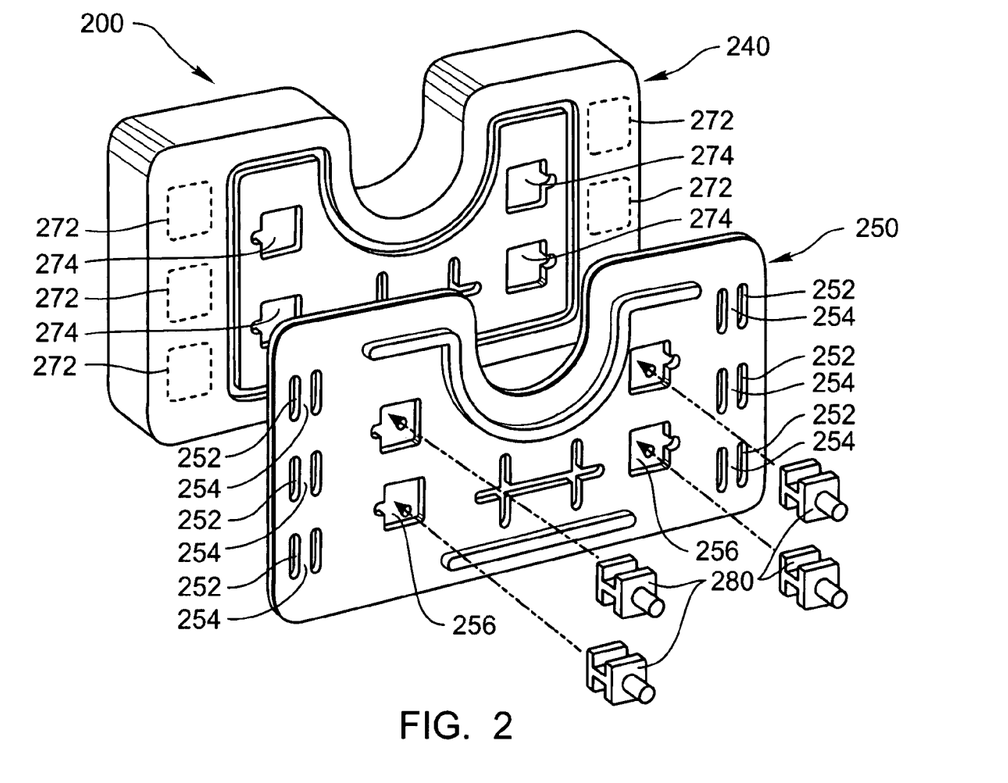
FIG. 2 is an exploded perspective view of an embodiment of a knee airbag system.

FIG. 2 is an exploded perspective view of an embodiment of a knee airbag system 200. The knee airbag system 200 may include a reaction plate 250, an airbag 240, and instrument panel clips 280.

The expansive forces in the airbag 240 interplay against the reaction plate 250 to deploy the airbag 240 in the proper direction. The reaction plate 250 may be made of various materials that are capable of responding to these expansive forces. For example, the reaction plate 250 may be made of metal, such as steel, aluminum, etc., ceramics, composite materials, dissimilar plastics, plastics with different melting points, or other suitable materials. The reaction plate 250 may include a plurality of apertures 252. The apertures 252, in the present embodiment, are separated by a web 254, such that each aperture 252 is paired with another aperture 252. Other embodiments may not pair each aperture 252 with another aperture 252. Further embodiments may also group more than two apertures 252.

The airbag 240 of the present embodiment includes various locations 272 that correspond to one or more of the apertures 252 in the reaction plate 250. These locations 272 will be discussed in more detail below.

The airbag 240 may also include pockets 274 that are used for connecting the knee airbag system 200 to the instrument panel 42 (Shown in FIG. 1). The reaction plate 250 may also include four instrument panel clip apertures 256 that are used for connecting the instrument panel 42 to the knee airbag system 200. The instrument panel clips 280 may be inserted through the instrument panel clip apertures 256 in the reaction plate 250 and into the pockets 274 in the airbag 240. The instrument panel clips 280 may then be used to connect the knee airbag system 200 to the instrument panel 42. The instrument panel clips 280, in the present embodiments, are of a type manufactured by ABC Group of Canada, though any method for attaching the knee airbag system 200 to the instrument panel 42 may be used.

Figure 3:
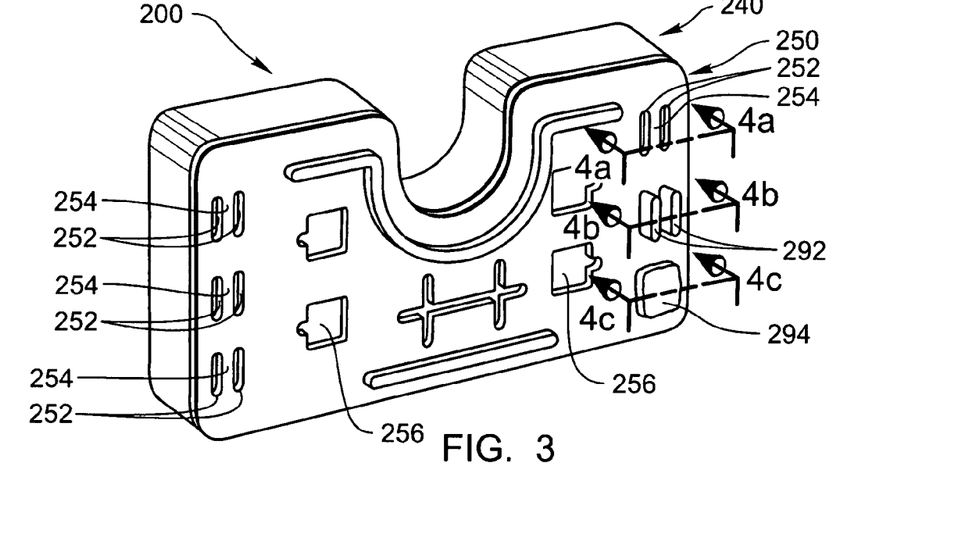
FIG. 3 is a partially assembled perspective view of an embodiment of the knee airbag system of FIG. 2.

FIG. 3 is a partially assembled perspective view of an embodiment of the knee airbag system 200 of FIG. 2. The embodiment of FIG. 3 includes an airbag 240 and a reaction plate 250. No instrument panel clips 280 are shown, but clips 280 or any other method may be used to connect the knee airbag system 200 to the instrument panel 42 (Shown in FIG. 1). The partially assembled embodiment includes protrusions 292 that extend through the apertures 254 in the reaction plate 250. In the present embodiment, the protrusions 292 were extruded through the apertures 252 using a blow molding manufacturing process. In other embodiments, other manufacturing processes may be used to extend the protrusions 292 through the apertures 252. Examples of manufacturing processes that may be used to extend a protrusion 292 through an aperture 252 may include injection molding, compression molding, transfer molding, extrusion molding, blow molding, rotational molding, thermoforming, reaction injection molding, expandable bead molding, vacuum plug assist molding, pressure plug assist molding, matched molding, or any other manufacturing processes that cause a protrusion 292 to extend through an aperture 252.

The right side of the assembly shows possible stages during manufacture. The uppermost apertures 252 do not yet have a protrusion 292. The middle apertures 252 show protrusions 292 extending therethrough as formed by one or more of the above mentioned processes. The lowermost apertures are not seen because the modified protrusion 294 has bonded the protrusions 292 together using a thermoplastic welding or other processes described below.

Some of the protrusions 292, in the present embodiment, have been modified using thermoplastic welding to melt the pairs of protrusions 292 such that the protrusions 292 are bonded together to form modified protrusions 294. The modified protrusions 294 may limit detachment of the airbag 240 from the reaction plate 250. In other embodiments, the protrusions 292 may be modified using other processes such as ultrasonic welding, contact welding, heat staking, cold staking, high frequency electromagnetic welding, hot gas welding, contact welding, hot plate welding, spin welding, solvent welding, vibration or friction welding, laser welding, thermal melt bonding, adhesive bonding, or other modification processes that may achieve a similar result.

Figure 4A:
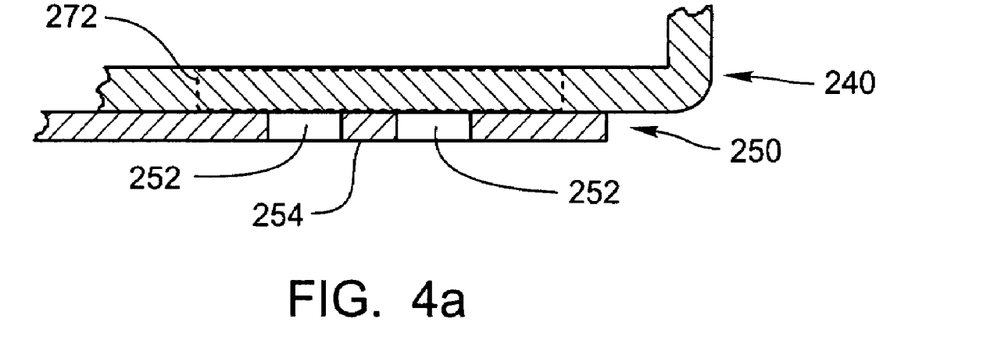
FIG. 4a is a partial cutaway sectional view of an embodiment of a knee airbag system along line 4a-4a of FIG. 3.
Figure 4B:
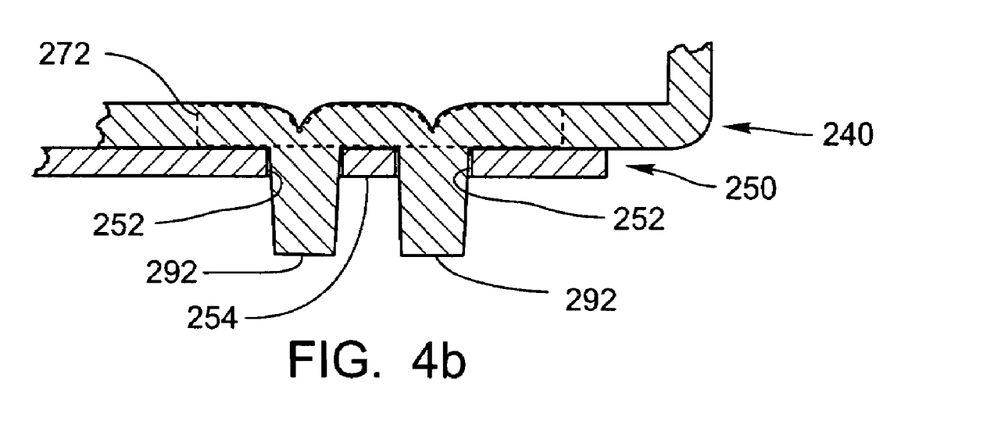
FIG. 4b is a partial cutaway sectional view of the embodiment of another knee airbag system along line 4b-4b of FIG. 3.
Figure 4C:
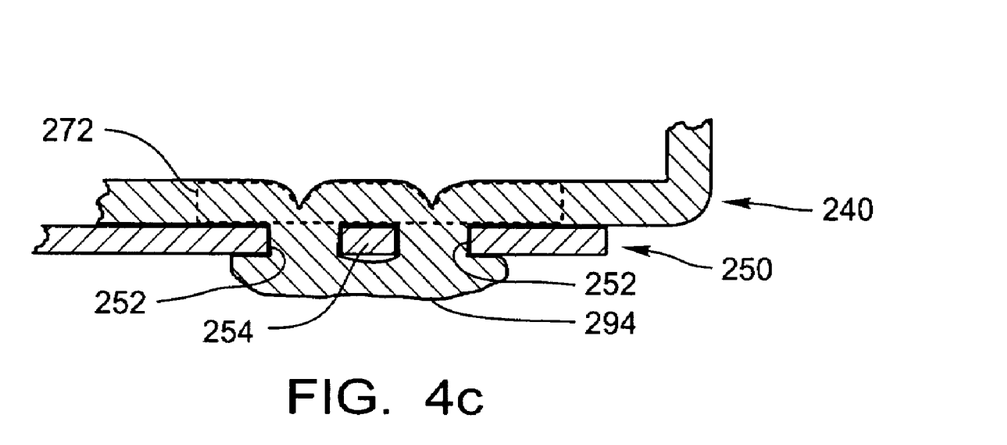
FIG. 4c is a partial cutaway sectional view of a further embodiment of a knee airbag system along line 4c-4c of FIG. 3.

Referring to FIGS. 4a-c, FIG. 4a is a partial cutaway sectional view of an embodiment of a knee airbag system 200 along line 4a-4a of FIG. 3; FIG. 4b is a partial cutaway sectional view of the embodiment of another knee airbag system 200 along line 4b-4b of FIG. 3; and FIG. 4c is a partial cutaway sectional view of a further embodiment of a knee airbag system 200 along line 4c-4c of FIG. 3.

The present embodiment, as shown in FIGS. 4a-c, includes an airbag 240 and a reaction plate 250. The reaction plate 250 may include apertures 252 and a web 254 separating the apertures 252. The airbag 240, in the present embodiment, is produced by the blow molding manufacturing process. For example, a parison (not shown) may be inserted into a mold (not shown) with the reaction plate 250 and the parison may be blown into the mold to create the airbag 240. The airbag 240 may also be produced by other manufacturing processes, such as those listed above or another process.

Referring to FIG. 4a, the airbag 240 may include locations 272 that correspond to the apertures 252 in the reaction plate 250. The material from the locations 272, in the present embodiment, is used to extend the protrusions 292 shown in FIG. 4b. The protrusions 292 may be extended using a manufacturing process. In the present embodiment, the material from the locations 272 is extended into protrusions 292 using a blow molding process.

For example, the reaction plate 250 may be inserted into a mold (not shown). In some embodiments, the reaction plate 250 is inserted into the mold just prior to blowing the parison (not shown) to its molded final shape. When the parison is blown into the shape of the airbag 240, the locations 272 on the partially blown airbag 240 may be aligned such that the various locations 272 on the front face parison (i.e., the partially blown airbag 240) may be aligned with their corresponding apertures 252 in the reaction plate 250. The material from the various locations 272 in the partially blown airbag 240 may then be extended into protrusions 292 through their corresponding apertures 252 in the reaction plate 250. In other embodiments, other manufacturing processes may be used to extend the material from the various locations 272 on the airbag 240 into protrusions 292, as discussed above.

In some embodiments, the protrusions 292 that are separated by a web 254 may be modified such that the protrusions 292 become modified protrusions 294. In the present embodiment, the protrusions 292 may bond together in the heated mold, as shown in FIG. 4c to become modified protrusions 294. When the airbag 240 and the reaction plate 250 cool the modified protrusions 294 may capture the web 254 to limit detachment of the airbag 240 from the reaction plate 250.

In other embodiments, the protrusions 292 may not be modified in the mold, but rather may be modified by another process outside of the mold. Examples of these modification processes are provided above.

Figure 5:
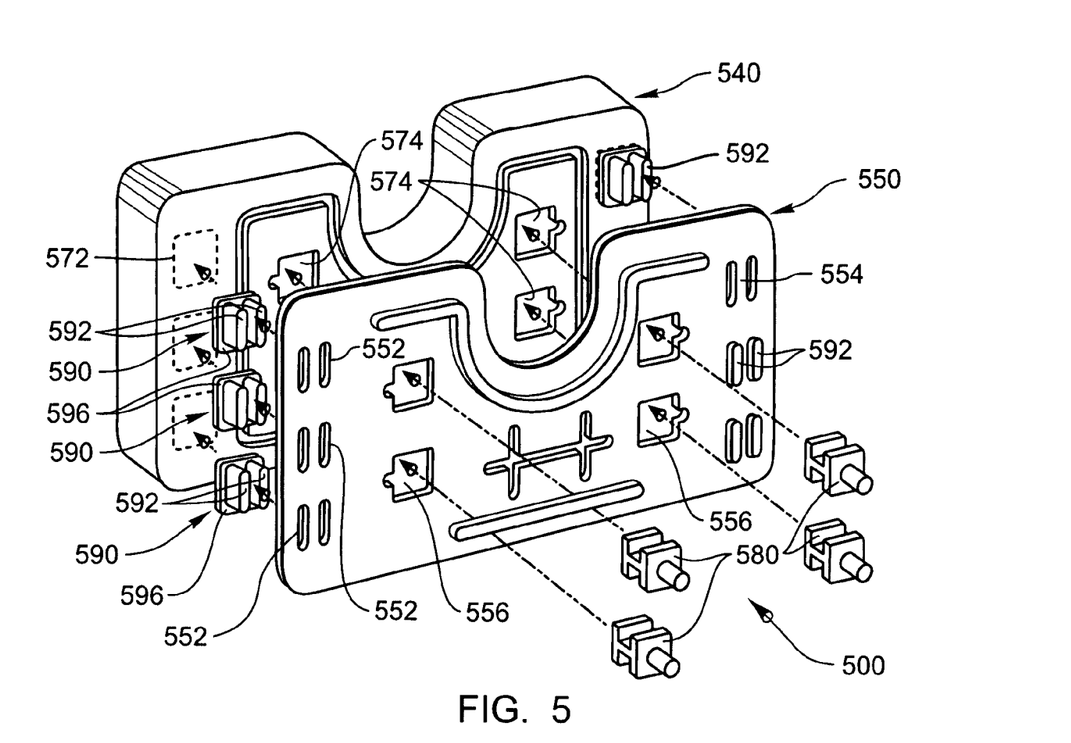
FIG. 5 is an exploded perspective view of another embodiment of a knee airbag system.

FIG. 5 is an exploded perspective view of another embodiment of a knee airbag system 500. The knee airbag system 500 may include an airbag 540, a reaction plate 550, protrusion pieces 590, and instrument panel clips 580. The instrument panel clips 580 may be used to attach the knee airbag system 500 to the instrument panel 42 (See FIG. 1).

The reaction plate 550 may be made of various materials, as described above. The reaction plate 550 may include a plurality of apertures 552. The apertures 552, in the present embodiment, are separated by a web 554, such that each aperture 552 is paired with another aperture 552. Other embodiments may not pair each aperture 552 with another aperture 552. Further embodiments may also group more than two apertures 552.

The protrusion pieces 590, in the present embodiment, include a base 596 and two protrusions 592. In other embodiments the protrusion pieces 590 may include one protrusion 592 or multiple protrusions 592 on each base 596 or may not include a base 596.

The airbag 540 may include various locations 572 that correspond to one or more of the apertures 552 in the reaction plate 550. In the present embodiment, the locations 572 are not used to extend the protrusions 592. Rather, the locations 572 are used to connect the base 596 of the protrusion pieces 590 to the airbag 540. For example, the protrusion pieces 590 may be inserted into the apertures 552 in and secured to the reaction plate 550.

The right side of the assembly shows possible stages during the manufacture. The lowermost apertures 552 are not seen because the modified protrusion 594 has bonded protrusions 592 together using a thermoplastic welding or similar process. The upper two apertures 552 show protrusions 592 extending therethrough.

The airbag 540 may also include pockets 574 that are used for connecting the knee airbag system 500 to the instrument panel 42 (See FIG. 1). The reaction plate 550 may also include four instrument panel clip apertures 556 that are used for connecting the instrument panel 42 to the knee airbag system 500. The instrument panel clips 580 may be inserted through the instrument panel clip apertures 556 in the reaction plate 550 and into the pockets 574 in the airbag 540. The instrument panel clips 580 may then be used to connect the knee airbag system 500 to the instrument panel 400.

Figure 6:
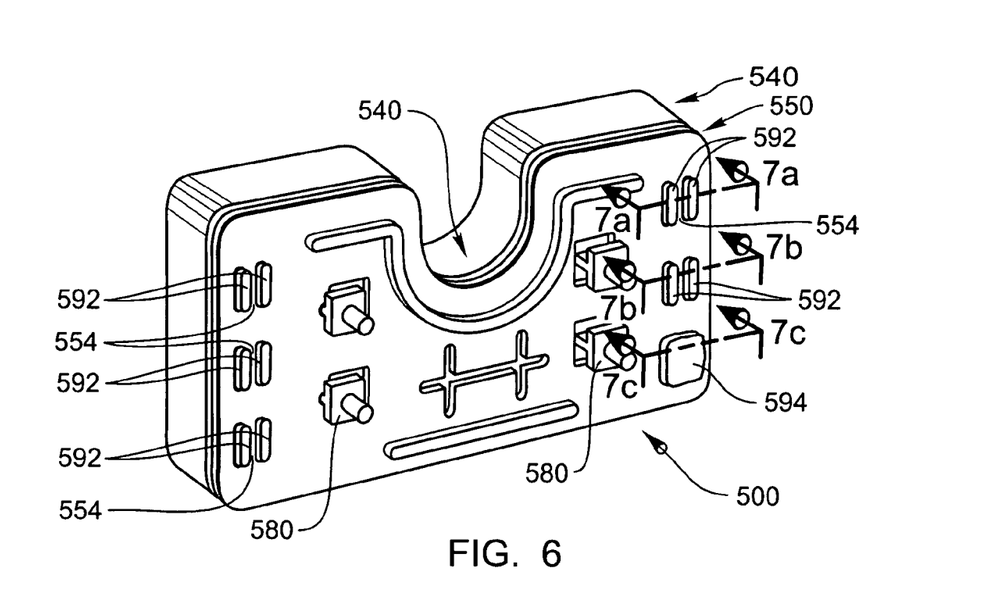
FIG. 6 is a partially assembled perspective view of an embodiment of the knee airbag system of FIG. 5.

FIG. 6 is a partially assembled perspective view of an embodiment of a knee airbag system 500. The embodiment of FIG. 6 includes an airbag 540, reaction plate 550, and instrument panel clips 580. The instrument panel clips 580 or another method may be used to connect the knee airbag system 500 to the instrument panel 42 (See FIG. 1). The present embodiment includes protrusions 592 that extend through the apertures 554 in the reaction plate 550. In the present embodiment, the protrusions 592 were originally a part of a protrusion piece 590.

Some of the protrusions 592, in the present embodiment, have been modified using thermoplastic welding to melt the pairs of protrusions 592 such that the protrusions 592 are bonded together to form modified protrusions 594. The modified protrusions 594 may limit detachment of the airbag 540 from the reaction plate 550. In other embodiments, the protrusions 592 may be modified using the modification processes described above or other modification processes.

Figure 7A:
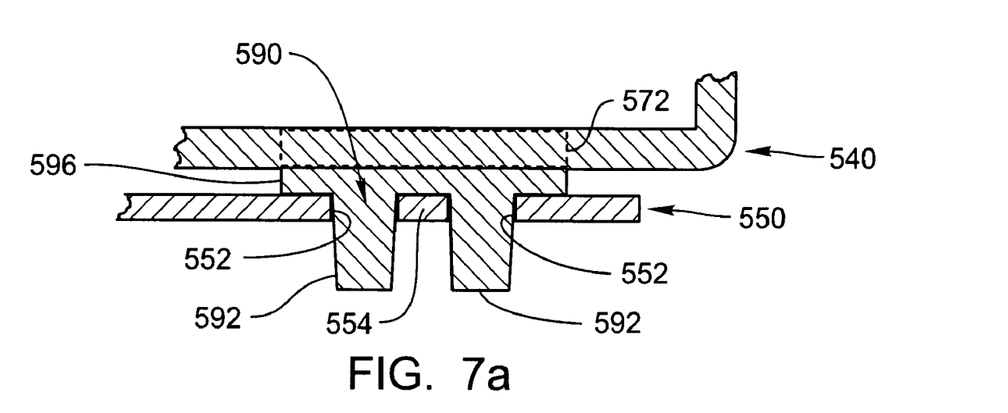
FIG. 7a is a partial cutaway sectional view of an embodiment of a knee airbag system along line 7a-7a of FIG. 6.
Figure 7B:
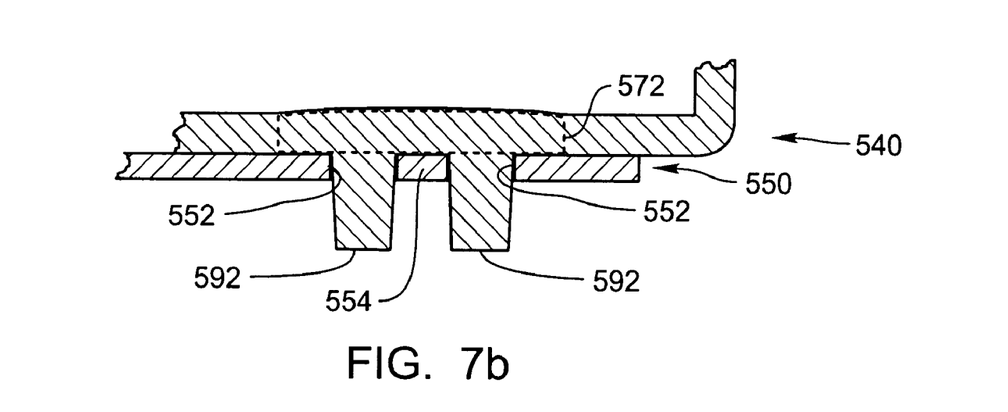
FIG. 7b is a partial cutaway sectional view of another embodiment of a knee airbag system along line 7b-7b of FIG. 6.
Figure 7C:
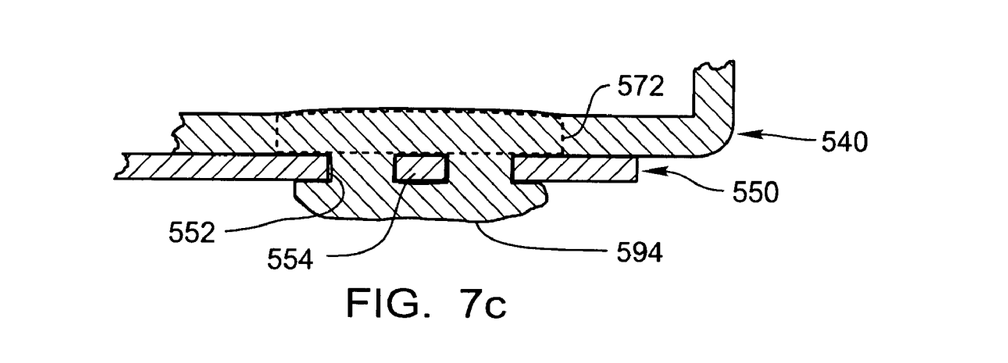
FIG. 7c is a partial cutaway sectional view of a further embodiment of a knee airbag system along line 7c-7c of FIG. 6.

Referring to FIGS. 7a-c, FIG. 7a is a partial cutaway sectional view of an embodiment of a knee airbag system 500 along line 7a-7a of FIG. 6; FIG. 7b is a partial cutaway sectional view of another embodiment of a knee airbag system 500 along line 7b-7b of FIG. 6; and FIG. 7c is a partial cutaway sectional view of a further embodiment of a knee airbag system 500 along line 7c-7c of FIG. 6.

The present embodiment, as shown in FIGS. 7a-c, includes a reaction plate 550, an airbag 540, and a protrusion piece 590. The reaction plate 550 may include apertures 552 and a web 554 separating the apertures 552. The airbag 540, in the present embodiment, is produced by the blow molding manufacturing process. For example, a parison (not shown) may be inserted into a mold (not shown) with the reaction plate 550 and the parison may be blown into the mold to create the airbag 540. The airbag 540 may also be produced by another manufacturing process, such as the processes listed above or another process.

Referring to FIG. 7a, the airbag 540 may include locations 572 that correspond to the apertures 552 in the reaction plate 550. In the present embodiment, the locations 572 are not used to extend the protrusions 592, shown in FIG. 7b. Rather, the locations 572 are used to connect the base 596 of the protrusion pieces 590 to the airbag 540. The base 596 may be connected to the locations 572 on the airbag 540 using a manufacturing process. In the present embodiment, the manufacturing process is a blow molding process that directly connects the base 596 to the airbag 540. In other embodiments, other manufacturing processes or modification processes may be used.

For example, the reaction plate 550 may be inserted into a mold (not shown). The parison may then be blown into its molded final shape. When the parison is blown into the shape of the airbag 540, the locations 572 on the partially blown airbag 540 may be aligned such that the various locations 572 on the parison (i.e., the partially blown airbag 540) may be aligned with their corresponding apertures 552 in the reaction plate 550. The material from the various locations 572 in the partially blown airbag 540 may then touch the base 596 of the protrusion piece 590. The locations 572 of the partially blown airbag 540 may be sufficiently hot to cause some of the material of the bases 596 to bond to the locations 572 on the airbag 540. In other embodiments, the bases 596 of the protrusion pieces 590 may be connected to the airbag 540 using a modification processes, such as the modification processes disclosed above (i.e., adhesive bonding), or using a manufacturing process, such as the manufacturing processes disclosed above (i.e., rotational molding).

In some embodiments, the protrusions 592 that are separated by a web 554 may be modified such that the protrusions 592 become modified protrusions 594. In the present embodiment, the protrusions 592 may bond together in the heated mold, as shown in FIG. 7c, to become modified protrusions 594. When the airbag 540 and the reaction plate 550 cool the modified protrusions 594 may capture the web 554 to limit detachment of the airbag 540 from the reaction plate 550.

In other embodiments, the protrusions 592 may not be modified in the mold, but rather may be modified by another process outside of the mold. Examples of these modification processes are provided above.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A knee airbag system for a vehicle comprising:
a metal reaction plate comprising:
   at least one web; and
   a plurality of apertures, wherein at least two of the apertures are separated by the at least one web; and
an airbag comprising a plurality of protrusions extending through the plurality of apertures for securing the reaction plate to the airbag, wherein at least one pair of the plurality of protrusions are thermoplastically welded together.

2. A knee airbag system for a vehicle comprising:
a reaction plate having a plurality of apertures;
an airbag having a plurality of locations disposed to correspond to the plurality of apertures upon positioning the airbag for attachment to the reaction plate; and
a plurality of protrusions extending through the plurality of apertures for securing the reaction plate to the airbag, at least one of the plurality of protrusions further comprises a base, the base being disposed between the reaction plate and one of the plurality locations, wherein the at least one of the plurality of protrusions having the base shares the base with at least one other of the plurality of protrusions.

3. The knee airbag system of claim 2, wherein the base of at least one of the plurality of protrusions is connected to at least one of the plurality of locations.

4. The knee airbag system of claim 3, wherein the base of at least one of the plurality of protrusions is connected to at least one of the plurality of locations using a blow molding process.

5. The knee airbag system of claim 2, wherein the at least one of the plurality of protrusions having the base shares the base with at least one other of the plurality of protrusions.

* * * * *